United States Patent [19]

Frank

[11] Patent Number: 5,655,732
[45] Date of Patent: Aug. 12, 1997

[54] APPARATUS FOR DRAINING WASTE WATER FROM AIRCRAFT

[75] Inventor: Helge Frank, Hamburg, Germany

[73] Assignee: Daimler-Benz Aerospace Airbus GmbH, Hamburg, Germany

[21] Appl. No.: 400,923

[22] Filed: Mar. 9, 1995

[30] Foreign Application Priority Data

Mar. 14, 1994 [DE] Germany .................. 44 08 493.5

[51] Int. Cl.$^6$ .................. B64D 15/00; B64D 47/00
[52] U.S. Cl. .................. 244/1 R; 244/129.1; 244/134 R; 244/136; 239/171
[58] Field of Search .................. 244/136, 134 R, 244/134 B, 134 D, 129.1, 1 R, 121; 239/171

[56] References Cited

U.S. PATENT DOCUMENTS 4,783,026  11/1988  Rumford et al. .................. 244/134 B
5,290,996   3/1994  Giamafi et al. .................. 244/136

FOREIGN PATENT DOCUMENTS 557905  12/1993  United Kingdom .................. 244/134 B

*Primary Examiner*—Galen Barefoot
*Attorney, Agent, or Firm*—W. G. Fasse; W. G. Fasse

[57] ABSTRACT

A waste water drain apparatus (1) is to be attached to the fuselage belly (2) of an aircraft. The apparatus (1) essentially includes a drain pipe (3), an aerodynamically shaped fairing (7) enclosing the drain pipe (3), an attachment flange (6) for connecting the apparatus to the aircraft, at least one temperature sensor (9), and either at least one heating element (8) or hot air inlet (13) for heating the drain pipe (3). An inlet end (4) of the drain pipe (3) is to be connected to a waste water system of the aircraft. An outlet end (5) of the drain pipe (3) exits rearward at the trailing edge of the fairing so that the lengthwise axis of the drain pipe outlet is substantially parallel with the air flow during flight. Either hot air is caused to flow along the drain pipe (3), or heating elements are arranged near or on the inner surface of the fairing (7) at least at the area where the drain pipe outlet end (5) passes through the fairing (7) and near or on the inner surface of the attachment flange (6) at the area where the drain pipe (3) passes through the flange (6). Freezing of the drain pipe is prevented and waste water can be drained at any time during flight.

20 Claims, 2 Drawing Sheets

5,655,732

APPARATUS FOR DRAINING WASTE WATER FROM AIRCRAFT

FIELD OF THE INVENTION

The invention relates to an apparatus for draining waste water from an aircraft, including a drain pipe and an aerodynamically shaped fairing surrounding the drain pipe. The drain pipe has an inlet end connected to the waste water system of the aircraft and an outlet end opening rearward, with its lengthwise axis substantially parallel to the airstream direction during flight. A heating element controlled by a temperature sensor may also be provided.

BACKGROUND INFORMATION

It is generally known in the art to equip aircraft with at least one apparatus for draining the waste water that arises during flight, for example, the waste water from hand wash basins or the wash water from on-board galleys. For example, it is known to provide a so-called drain mast on the underside or belly of an aircraft. The drain mast includes a drain pipe and a fairing that are attached to the aircraft belly by an attachment flange. The aerodynamically shaped fairing tapers to a narrow rear edge, and the outlet end of the drain pipe also extends approximately horizontally and rearwardly to terminate in a sharp edged or sharply angled drain pipe outlet. Such an arrangement ensures that the waste water will be ejected into the airstream with low turbulence and at a prescribed spacing away from the fuselage skin, so that the waste water does not run along or freeze on the fuselage. However, when the aircraft is operating in a cold environment, for example at high altitudes, the problem of icing of the drain apparatus arises. In order to prevent icing of the known drain apparatus, an electric heater is arranged on the drain pipe and controlled by a temperature sensor. The electric heater is only arranged on the drain pipe in the area well within the interior of the fairing. It is not possible to arrange electric heaters on the drain pipe near the inlet end of the pipe where it passes through the attachment flange or near the outlet end of the pipe where it passes through the narrow trailing edge of the fairing, because both of those areas are narrow or tight spaces and there is no room for conveniently locating a heater on the pipe.

Thus, in the known arrangement, heat is applied rather non-uniformly along the drain pipe. Because the portions of the pipe at the outlet end and in the area near the attachment flange are not directly heated, but rather exposed to the cold environment around the aircraft, the danger exists that the drain pipe can freeze up, especially at the unheated areas, despite an intensive heating of the other pipe areas. As a result, it is a serious disadvantage of the known waste water draining apparatus that the drain pipe can freeze up despite intensive heating of certain portions of the drain pipe. A freeze-up of any portion of the drain pipe puts at risk the functionality of the entire waste water system because it would no longer be possible to drain the waste water during the flight.

OBJECTS OF THE INVENTION

In view of the above it is the aim of the invention to achieve the following objects singly or in combination:

- to provide a waste water drain apparatus of the above described general type, which aims to reliably prevent freezing of the drain pipe and thereby assure that waste water can be drained at all times during a flight so as to maintain the functionality of the entire waste water system;
- to reliably eject waste water from the outlet end of a drain pipe into the airstream at a prescribed distance away from the aircraft fuselage skin;
- to provide sufficient heating for the drain pipe especially at the areas where a freeze-up was likely in the prior art, namely near the outlet end of the drain pipe and at the area where the drain pipe passes through the attachment flange;
- to reduce the total required heating input and control undesired loss of heat to the external environment by appropriately providing insulation in the aerodynamic fairing;
- to improve the strength and stability of the entire apparatus and to seal the apparatus against penetration of water;
- to provide an advantageous arrangement of electric heaters in various locations on the inner surface of the fairing and on the drain pipe itself; and
- to use a flow of heated air to completely surround and uniformly heat the drain pipe, especially at the freeze-prone areas.

SUMMARY OF THE INVENTION

The above objects have been achieved in an apparatus for draining waste water from aircraft according to the invention, wherein at least one heating element is arranged within the fairing, near the inner surface of the fairing, at the area where the drain pipe passes through the attachment flange and at the area where the outlet end of the drain pipe passes through the fairing. The above objects have also been achieved in another embodiment of the invention, wherein a hot air inlet passing through the aircraft fuselage directs heated air into the space within the aerodynamic fairing. After heating the drain pipe, the hot air escapes from the fairing at a hot air outlet near the outlet end of the drain pipe.

An insulating layer may be provided between the fairing and the heating element so as to prevent the undesired loss of heat to the external environment around the aircraft. At least one additional heating element can be arranged directly on or in the vicinity of the drain pipe within the fairing. In this manner, the total required heating input can be reduced because it is only necessary to arrange heating elements near the surface on the fairing directly at those areas of high heat loss. At the other areas within the fairing, namely along the length of the drain pipe, it is more effective to arrange heating elements directly on the drain pipe.

It is further provided that a supporting core, preferably consisting of a hard foam material, can surround and enclose the drain pipe and completely fill the space within the fairing. In this manner the strength and rigidity of the entire apparatus is increased and the apparatus is sealed against water penetration.

In the embodiment using hot air for heating the drain pipe, the hot air is preferably provided by the hot bleed-air system, i.e. from an air tap on a jet engine. In this manner, a source of energy and heat already existing in the aircraft can be used effectively and efficiently for heating the waste water drain apparatus. When the hot air inlet comprises a controllable valve that is controlled in conjunction with a temperature sensor, the heating energy being applied can be exactly matched with the environmental conditions existing at any time.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
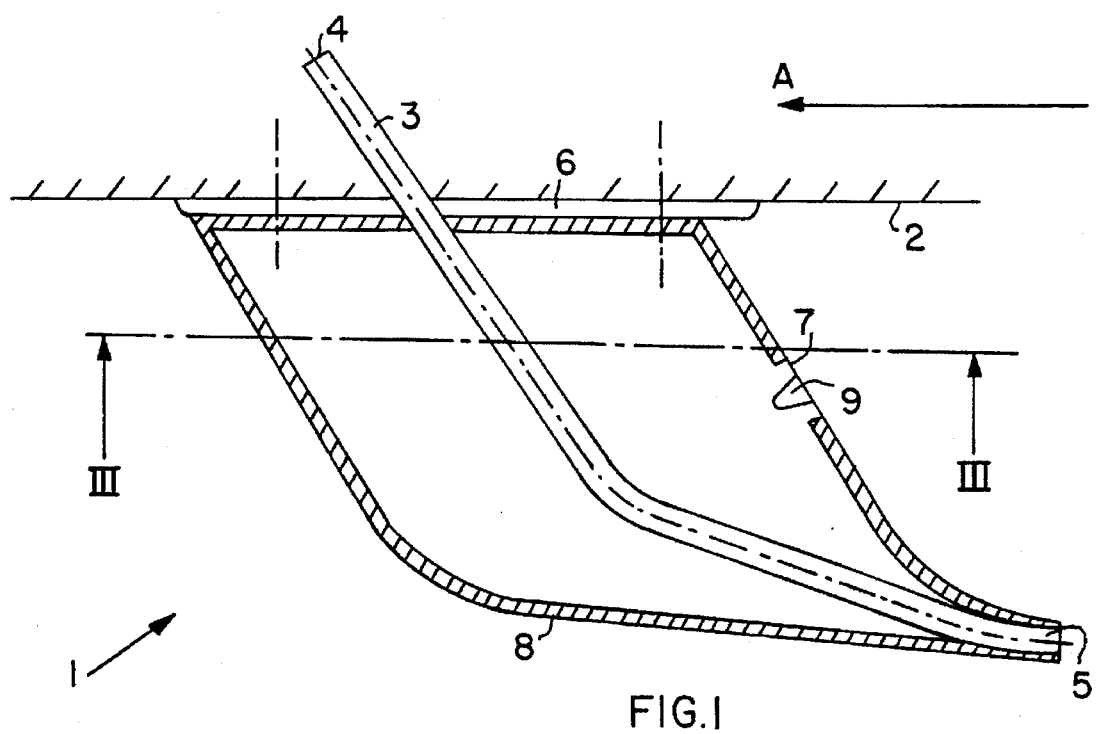
FIG. 1 is a schematic lengthwise sectional view of a first embodiment of a waste water drain apparatus according to the invention.

FIG. 1 schematically shows a first embodiment of a waste water drain apparatus 1 for an aircraft. The apparatus 1 is provided on the underside or belly 2 of an aircraft, for draining and ejecting overboard the waste water that arises in the aircraft, for example, waste water from the on-board galleys or the hand wash basins provided in the rest rooms in the aircraft. The waste water drain apparatus 1 essentially comprises a drain pipe 3 and an aerodynamically advantageously shaped fairing 7. The drain pipe 3 has an inlet end 4 connected to a waste water system of the aircraft, and an outlet end 5 which opens rearward, i.e. in a direction opposite the flight direction indicated by arrow A. The outlet end 5 of the drain pipe 3 is arranged so that its lengthwise axis is approximately parallel to the air flow that exists during flight of the aircraft.

The aerodynamic fairing 7 encloses the drain pipe 3. The fairing 7 tapers toward its rear trailing edge, and accordingly, the outlet end 5 of the drain pipe 3 also exits toward the rear, with sharp edges or a sharply angled end. The apparatus 1 is screwed onto the aircraft belly 2 by means of an attachment flange 6.

In the embodiment shown in FIG. 1, the drain pipe 3 itself extends through and is bare within the inner space of the fairing 7 and is not directly heated, that is to say heaters are not arranged directly on the drain pipe 3. Instead, heating elements 8 are provided over substantially the entire inner surface of the fairing 7. The heating elements 8 are also provided along the attachment flange 6, to counteract the cooling effect or heat loss through the attachment flange 6 to the aircraft fuselage belly 2 and the surrounding environment. Preferably, the heating elements 8 are electrically powered film- or wire-type resistance heating elements.

A temperature sensor 9 is arranged on the surface of the fairing 7 and is preferably not in direct contact with the heating elements 8. The sensor 9 measures the existing temperature and provides a corresponding temperature signal to a temperature controller (not shown), which then controls the heating elements 8 so that the drain pipe 3 is surrounded along its entire length by a warm fairing, whereby a temperature above the freezing point is assured along the entire drain pipe 3. The entire heated surface is uniformly subjected to heat loss to the surrounding 20 airstream, so that local undercooling is prevented.

Figure 2:
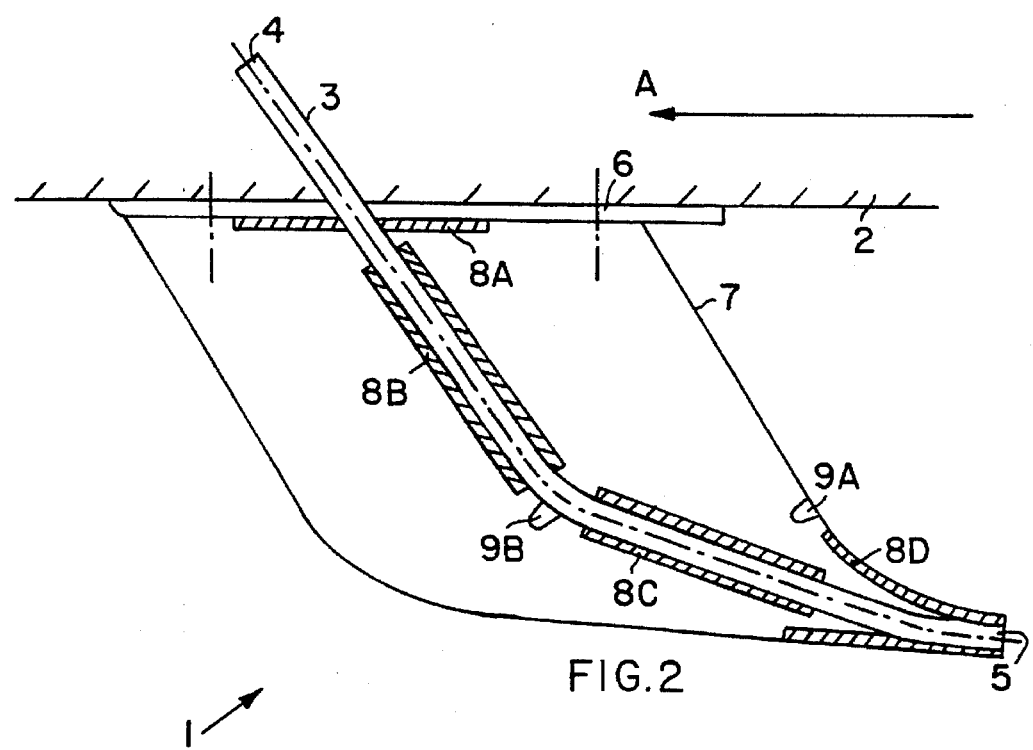
FIG. 2 is a schematic lengthwise sectional view of a second embodiment of a waste water drain apparatus according to the invention.

FIG. 2 shows a second embodiment of the apparatus 1 according to the invention. The general structure of the apparatus shown in FIG. 2 corresponds to that shown in FIG. 1, and the same reference numbers are used to identify the same or corresponding elements. In this second embodiment, the heating elements 8 arranged near the surface of the fairing 7 are limited to the areas subject to an especially high heat loss. Preferably, one of these areas is the area where the drain pipe 3 passes through the attachment flange 6 to be connected to the waste water system of the aircraft, and another of these areas is the area where the outlet end 5 of the drain pipe 3 exits from the fairing 7. In these two areas, respective heating elements 8A and 8D are applied on the inner surface of fairing 7. Preferably, the heating elements 8A and 8D are electrically powered film or wire resistive heating elements. The other areas of the drain pipe 3 are heated by heating elements 8B and 8C arranged, for example glued, directly on the drain pipe 3 in the space within the fairing 7.

A first temperature sensor 9A is arranged at a measuring point on the fairing 7 near the area heated by heaters 8D and a second temperature sensor 9B is arranged directly on the drain pipe 3, to provide corresponding temperature signals to a temperature controller, which always maintains the temperature above the freezing point in order to prevent icing. The two temperature sensors 9A and 9B can be used as alternatives, or can both be used together. By appropriately dimensioning and arranging the combination of heating elements 8A and 8D with elements 8B and BC, the total required heating input power can be reduced.

Figure 3:
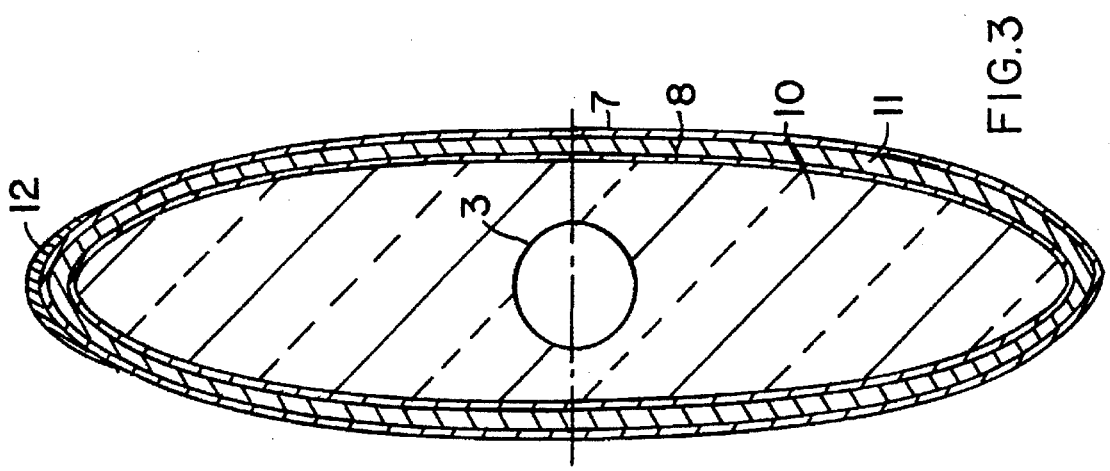
FIG. 3 is a cross-section taken along the line III—III in FIG. 1, showing additional features of the embodiments according to the invention.

FIG. 3 shows a cross-section along the line III—III of FIG. 1, but the view of FIG. 3 is rotated by 90°. As a particular feature of this embodiment, the drain pipe 3 is surrounded by a support core 10. An insulating layer 11 is provided between the heating elements 8 and the fairing 7. As can be seen in FIGS. 1 and 3, the heating element 8 extends substantially locally parallel to the fairing 7 and the flange 6, with the insulating layer 11 therebetween. The insulating layer 11 reduces the heat loss from the heating element 8 through the fairing 7 to the external environment. The support core 10 increases the strength and rigidity of the entire structure, including the enclosing heating elements 8, the insulating layer 11 arranged around the heating element 8, and the enclosing fairing 7. The support core 10 also seals the apparatus against the penetration of water into the interior of the apparatus.

The support core 10 preferably consists of a hard foam material, for example a hard foam based on a polyurethane, which completely fills all the hollow spaces within the apparatus 1 by foaming and expanding into the hollow space within the fairing 7. Alternatively, the hard foam support core 10 can be preformed, and then the heating elements 8 are glued or laminated onto the support core 10, and then the insulating layer 11, and finally the fairing 7 are applied or laminated thereon. The heating elements 8 are preferably embodied as resistive wire heating elements that surround the entire support core 10. The support core 10 as well as the insulating layer 11 can also be used in conjunction with the embodiments shown in FIGS. 2 and 3, modified as necessary to accommodate the different features of those embodiments.

The fairing 7 consists of a hard, polishable material and encloses all of the components of the waste water drain apparatus 1, to protect the components from damage and to reduce the aerodynamic drag resulting from surface friction and the form drag. Preferably, the fairing 7 is made of glass fiber and/or carbon fiber reinforced synthetic materials. The forward or leading edge of the fairing 7, namely the part of the fairing 7 that is first directly impinged upon by the air stream during flight, is protected by a leading edge reinforcing strip 12, which strengthens the fairing 7 in this area and protects the entire apparatus 1. The leading edge reinforcing strip 12 can be made of metal sheet materials common in aircraft construction, or aramid or carbon fiber reinforced synthetic materials.

Figure 4:
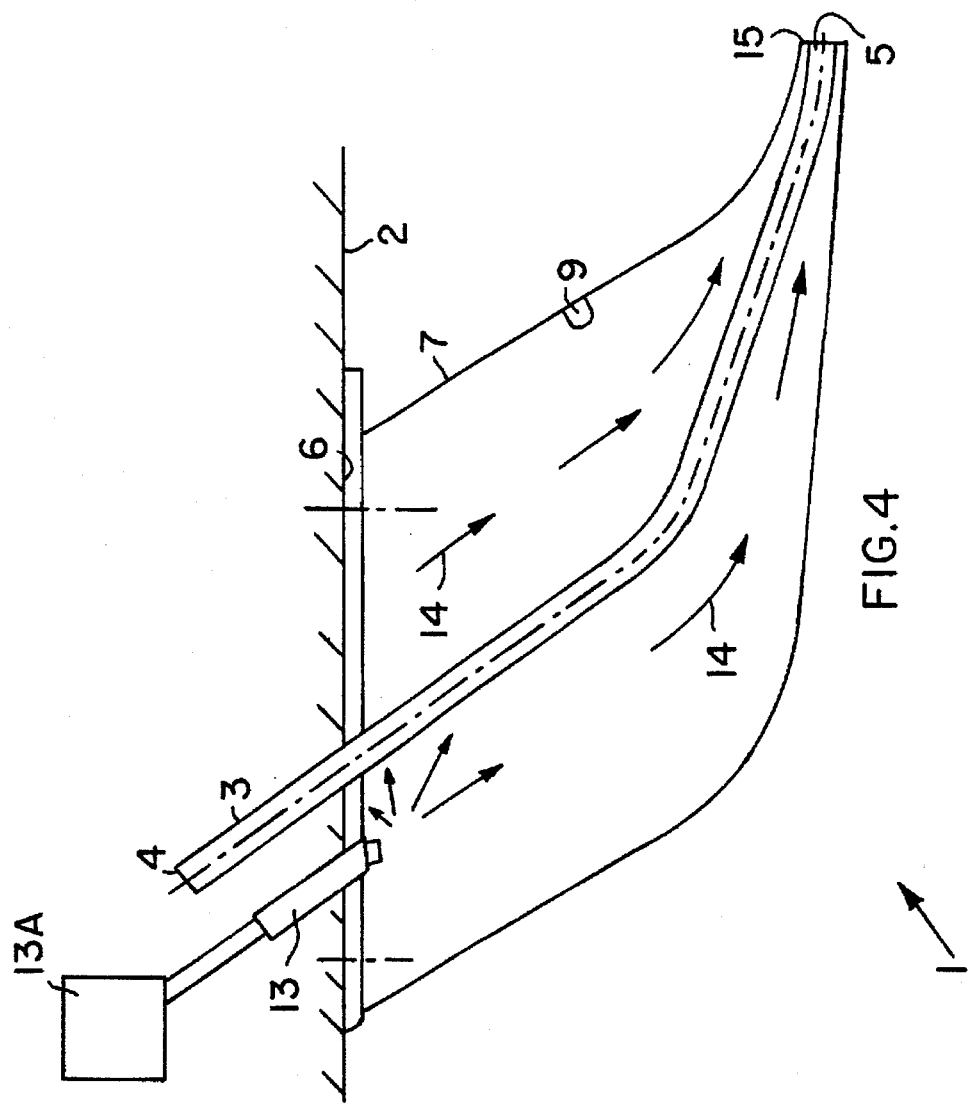
FIG. 4 is a schematic lengthwise sectional view of a third embodiment of a waste water drain apparatus according to the invention.

FIG. 4 shows another variant of the waste water drain apparatus 1 according to the invention. The embodiment shown in FIG. 4 includes a drain pipe 3 with an inlet end 4 and an outlet end 5, enclosed by an aerodynamic fairing 7 and attached to the belly 2 of an aircraft by an attachment flange 6, similarly to the embodiments described above. However, this embodiment does not include heating elements directly provided on the drain pipe 3 or the fairing 7. Instead, a hot air stream 14 is introduced into the space within the fairing 7 through a hot air inlet 13, so as to flow around the drain pipe 3 and heat the drain pipe 3 along its entire length. Preferably, the hot air inlet 13 is connected to a hot bleed air tap 13A of a jet engine of the aircraft. Thus, a small portion of the engine bleed air or tap air that is used within the aircraft in various systems as an energy, heat, or fresh air source can be used to provide the necessary heating for the waste water drain apparatus 1.

The hot air inlet 13 is arranged on the aircraft belly 2, to pass 20 through the fuselage and the attachment flange 6, and open into the space within the fairing 7. Preferably, the hot air inlet 13 comprises a control valve. The control valve air inlet 13 is controlled depending on the surrounding temperature sensed by a temperature sensor 9, whereby the flow volume of the hot air stream 14 can be precisely controlled to provide exactly the degree of heating necessary. The air flow pattern of the air stream 14 is directed so that the areas of the drain pipe 3 particularly susceptible to freezing are completely surrounded by a flow of hot air.

The hot air stream 14 flows around and along the drain pipe 3 and then exits from the fairing 7 at a hot air outlet 15 in the area of the outlet end 5 of the pipe 3. This hot air outlet 15 is preferably an annular gap or opening between the outlet end 5 of the drain pipe 3 and the lower trailing edge portion of the fairing 7 where the outlet end 5 passes through the fairing 7. Thus, the outlet end 5 of the drain pipe 3 is completely surrounded by a layer of hot air, to prevent freezing even near the very end of the drain pipe 3.

Although the invention has been described with reference to specific example embodiments, it will be appreciated that it is intended to cover all modifications and equivalents within the scope of the appended claims. It should also be understood that any combination of compatible features recited in any of the claims is considered to be part of the present invention.

What is claimed is:

1. An apparatus for draining waste water from an aircraft, comprising an aerodynamically shaped fairing, a drain pipe arranged within said fairing and having an inlet end adapted to be connected to a waste water system of the aircraft and having an outlet end that exits from said fairing and opens generally toward the rear of the aircraft, an attachment flange supporting said drain pipe and adapted to attach said drain pipe and said fairing to a fuselage of the aircraft, and at least one heating element arranged within said fairing at at least one area selected from a first area directly on an inner surface of said attachment flange where said drain pipe passes through said flange and a second area directly on an inner surface of said fairing where said drain pipe passes through said fairing.

2. The apparatus of claim 1, wherein a plurality of said heating elements are arranged on substantially the entirety of said inner surfaces of said fairing and said attachment flange.

3. The apparatus of claim 1, wherein a plurality of said heating elements are arranged at said first area and said second area.

4. The apparatus of claim 1, wherein said heating element is an electrically resistive film heating element.

5. The apparatus of claim 1, further comprising at least one additional heating element arranged directly on said drain pipe within said fairing.

6. The apparatus of claim 1, further comprising a temperature sensor arranged on said fairing.

7. The apparatus of claim 1, further comprising a temperature sensor arranged on said drain pipe.

8. The apparatus of claim 1, wherein said fairing encloses a hollow space therein, and wherein said drain pipe extends through and is bare within said hollow space.

9. The apparatus of claim 1, wherein no heater assembly is arranged directly on said drain pipe.

10. An apparatus for draining waste water from an aircraft, comprising an aerodynamically shaped fairing, a drain pipe arranged within said fairing and having an inlet end adapted to be connected to a waste water system of the aircraft and having an outlet end that exits from said fairing and opens generally toward the rear of the aircraft, an attachment flange supporting said drain pipe and adapted to attach said drain pipe and said fairing to a fuselage of the aircraft, an insulating layer arranged within said fairing at at least one area selected from first area directly on an inner surface of said attachment flange where said drain pipe passes through said flange and a second area directly on an inner surface of said fairing where said drain pipe passes through said fairing, and at least one heating element arranged on an inner surface of said insulating layer and extending substantially parallel to said fairing at said first area or substantially parallel to said flange at said second area, with said insulating layer arranged between said at least one heating element and said inner surface of said attachment flange at said first area or said inner surface of said fairing at said second area.

11. The apparatus of claim 10, further comprising a supporting core arranged within said fairing, surrounding said drain pipe and filling an internal space within said fairing between said drain pipe and said at least one heating element.

12. The apparatus of claim 11, wherein said supporting core consists of a hard foam material.

13. The apparatus of claim 11, wherein said insulating layer is arranged on said inner surface of said fairing, said supporting core is arranged between said drain pipe and said insulating layer, and said at least one heating element is arranged between said supporting core and said insulating layer.

14. The apparatus of claim 13, further comprising at least one additional heating element arranged directly on said drain pipe.

15. The apparatus of claim 13, wherein said insulating layer is arranged at said first area and at said second area, and a plurality of said heating elements are arranged on said inner surface of said insulating layer at said first area and said second area.

16. The apparatus of claim 10, wherein said insulating layer is arranged on substantially the entirety of said inner surfaces of said fairing and said attachment flange, and a plurality of said heating elements are arranged on substantially the entirety of said inner surface of said insulating layer.

17. An apparatus for draining waste water from an aircraft, comprising an aerodynamically shaped fairing, a drain pipe arranged within said fairing and having an inlet end adapted to be connected to a waste water system of the aircraft and having an outlet end that exits from said fairing and opens generally toward the rear of the aircraft, an attachment flange supporting said drain pipe and adapted to attach said drain pipe and said fairing to a fuselage of the aircraft, a hot air inlet opening into a hot air space within said fairing and adapted to be connected to a hot air source of the aircraft, and a hot air outlet passing from said hot air space out through said fairing proximate said outlet end of said drain pipe, wherein said hot air space within said fairing surrounds said drain pipe and provides a hot air environment outside and around said drain pipe to prevent freezing conditions therein.

18. The apparatus of claim 17, wherein the hot air source is a jet engine bleed air tap.

19. The apparatus of claim 17, further comprising a temperature sensor, wherein said hot air inlet comprises a controllable valve adapted to be controlled based on a temperature signal output by said temperature sensor.

20. The apparatus of claim 17, wherein said hot air outlet is formed by a hole in said fairing providing an annular space around said outlet end of said drain pipe between said outlet end and said fairing.

* * * * *